Figure 1:
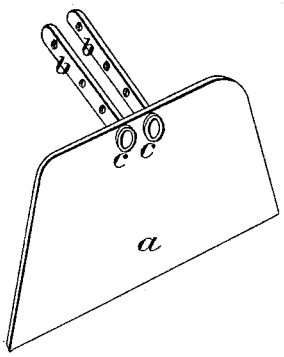
Figure 2:
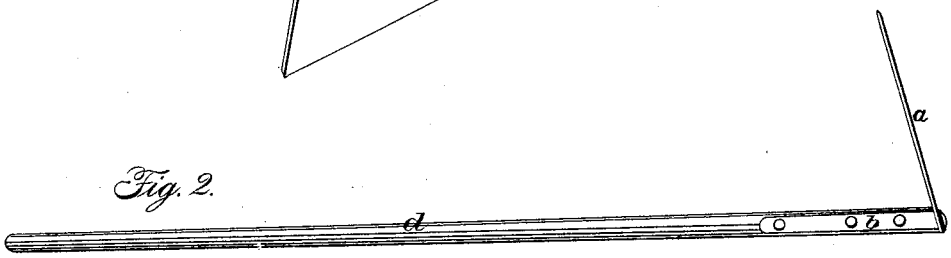
Figure 3:
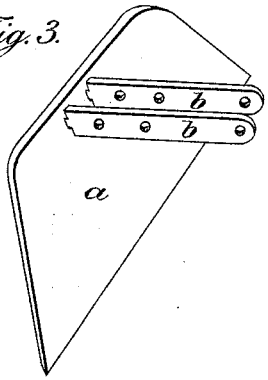
Figure 6:
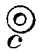
Figure 4:
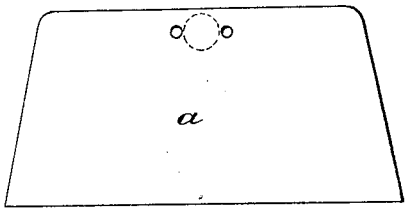
Figure 5:
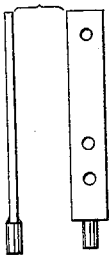

G. HARPER.

Hoe.

7807X

Patented Nov. 19, 1833.

AM. PHOTO-LITHO. CO. N.Y. (OSBORNES PROCESS)

7807X

UNITED STATES PATENT OFFICE.

GEORGE HARPER, OF MONTGOMERY COUNTY, PENNSYLVANIA.

IMPROVEMENT IN HOES.

Specification forming part of Letters Patent dated November 19, 1833.

*To all whom it may concern:*

Be it known that I, GEORGE HARPER, of the county of Montgomery and State of Pennsylvania, having invented a new and useful Improvement in the Mode of Making Hoes, and I do hereby declare that the following is a full and exact description of the improvement as invented by me.

The improvement is: Take a steel or iron-steeled blade of any size wanted, cut or punch two large square, round, or oval holes through the blade at a suitable distance to receive the handle in between them; then rivet two straps or lanquets with shoulders to bear against the blade of the hoe; then rivet those lanquets, with strong burr over both of them on the front of the hoe; then slip the handle between the two lanquets up to the blade, and secure the handle fast by riveting through the lanquets and handle with one, two, or more rivets, which keeps it always permanent and fast.

GEORGE HARPER.

Witnesses:
JACOB BRACK,
WILLIAM BAILEY.